US 6,184,651 B1

(12) United States Patent
Fernandez et al.

(10) Patent No.: US 6,184,651 B1
(45) Date of Patent: Feb. 6, 2001

(54) CONTACTLESS BATTERY CHARGER WITH WIRELESS CONTROL LINK

(75) Inventors: Jose M. Fernandez, Sunrise; Jaime A. Borras, Hialeah, both of FL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/531,402

(22) Filed: Mar. 20, 2000

(51) Int. Cl.[7] .................................................. H02J 7/00
(52) U.S. Cl. .................................................. 320/108
(58) Field of Search .................................. 320/108, 106, 320/111

(56) References Cited

U.S. PATENT DOCUMENTS

| | | | |
|---|---|---|---|
| 4,082,097 | * | 4/1978 | Mann et al. ................................ 607/33 |
| 5,739,674 | * | 4/1998 | Kawahara et al. .................... 320/106 |
| 5,952,814 | * | 9/1999 | Van Lerberghe ..................... 320/108 |
| 6,021,332 | * | 2/2000 | Alberth, Jr. et al. ................. 455/552 |

* cited by examiner

Primary Examiner—Peter S. Wong
Assistant Examiner—Pia Tibbits
(74) Attorney, Agent, or Firm—Scott M. Garrett

(57) ABSTRACT

In a contactless charging system charging energy is transferred across an inductive coupler to charge a battery (21) of a portable device, such as a two-way radio, cellular phone, paging device, or wireless communicator. The inductive coupler also provides a way for communicating at least one signal, such as to improve the charging process and the transfer of charging energy. Charging efficiency is improved by voltage regulation using feedback through the inductive coupler, or via a wireless RF link, and a controller (11) in-circuit with the primary side (12) of the inductive coupler. The controller (11) may communicate information signals via inductive coupling, or via a wireless RF link, for communicating with other devices such as smart cards and microphones or for control or data transfer.

5 Claims, 3 Drawing Sheets

CONTACTLESS BATTERY CHARGER WITH WIRELESS CONTROL LINK

TECHNICAL FIELD

This invention generally relates to the field of contactless battery chargers for portable devices, and more particularly to contactlessly charging a battery of a portable device while wirelessly coupling control and data signaling between devices.

DESCRIPTION OF THE PRIOR ART

Contactless electrical connections are well known in the field of portable electrical devices. For example, portable motorized toothbrushes typically contain a rechargeable battery which is charged by induction. Similarly, portable wireless communication devices, such as two-way RF radios, cellular phones, paging devices, and wireless communicators, commonly utilize a rechargeable battery that, in certain applications, is recharged by contactless induction charging. This conventional contactless charging normally is a one-way delivery of charging energy without any feedback control to the charger unit from the device being recharged. Unfortunately, this type of one-way contactless, or induction, charging can be slow, inefficient, and wasteful of energy.

Nevertheless, portable applications are becoming more popular because of the convenience afforded a user by working without a wired connection, such as not having to connect plugs to sockets, not having to precisely locate and plug a unit to be charged, and the ability to quickly "grab-n-go" remove from a charger unit a device that has been charged up. A primary disadvantage, however, is the inefficiency of charging portable devices via a one-way contactless interface. For example, in induction coupling, battery charging efficiencies of about 60% are typical and achievement of that efficiency usually requires clearances of 3 mm between the supply and load coils. The lower efficiency results in longer charge times and more wasted energy to charge devices.

In typical induction coupled charging systems, the best efficiencies have been achieved in products that have produced about 5 watts of power output and require high cost or high precision systems for induction coupling and resonant converter topology. Therefore, higher cost for charging arrangements, and longer times to charge a unit while wasting more energy, are drawbacks of conventional systems.

Accordingly, what is needed is a lower cost, more efficient induction coupled system capable of efficiently transferring electrical energy to the battery, such as capable of producing more than 5 watts of output power.

SUMMARY OF THE INVENTION

Improvements in battery technology for portable electronic devices have produced longer battery life and higher power outputs. While the Lithium Ion battery has increased the quality of power available for portable devices, its maximum charging potential is reached where battery charging methods permit higher efficiencies according to a charging profile. Additionally, in some cases it would be desirable to follow a charging profile to properly charge a battery. That is, the charging unit following an optimum charging curve would more efficiently deliver energy to charge a battery. According to the preferred embodiments of the present invention, a feedback control signal indicative of a charging state of a battery in a portable device is provided to a charging control circuit in a charger base device to control a contactless battery charging system thereby controlling the amount of energy being transferred to the battery. This advantageously improves the efficiency of the charging process. The transfer of energy for contactless charging the battery is preferably accomplished across inductively coupled coils between the charger base device and the portable device containing the battery. In a preferred embodiment of the present invention, the feedback control signal is coupled to the charging control circuit via an inductive link to regulate a charging circuit and the energy being transferred via inductive coupling to the battery. In an alternative preferred embodiment, an RF loop can be used for communicating control and data signals.

In the use of an RF loop, sufficient bandwidth would normally be available to accommodate each of the side bands carrying information between the primary and secondary, as in the application of frequency division multiplexing or frequency skipping or hopping or alternatively, a system of time division multiplexing could be used, as would be well known to one of ordinary skill in the art. The RF loop could be used, for example, to control and/or communicate data signals with wireless smart cards or wireless microphones or other devices in or connected to the portable device.

According to a preferred embodiment of the present invention, a contactless charging system with feedback control includes an inductive coupler for transferring energy from a primary side of the inductive coupler to a secondary side of the inductive coupler. A first primary controller coupled to the primary side of the inductive coupler controls the energy to the inductive coupler. A first secondary device is coupled to the secondary side of the inductive coupler to receive the energy transferred by the inductive coupler. A first sensing device is coupled to the secondary side of the inductive coupler for producing a first signal indicative of the energy received by the first secondary device. The inductive coupler can transfer the first signal indicative of the energy received by the first secondary device to the primary side and to the primary controller for controlling the energy transferred to the secondary side, responsive to the first signal.

Further disclosed according to an alternative preferred embodiment of the present invention is a charging system utilizing wireless feed back of control signaling and communicating data signaling with at least one portable device. The charging system, for example, includes a charger base device that can control at least one operating function in a portable device. The portable device preferably includes an encoder and an RF transmitter for encoding and transmitting the feedback signal and the base device includes an RF receiver and a decoder. Preferably, the portable device also includes an RF receiver and a decoder, and the base device includes an encoder and an RF transmitter. The portable device wirelessly transmits, for example, an encoded feedback signal to the base device that receives and decodes the feedback signal to control a charging operation. Further, the charging device wirelessly transmits an encoded data signal to the portable device that receives and decodes the data signal. The portable device, for example, controls functions in the device according to the data signal.

Additionally disclosed according to an alternative embodiment of the present invention is a method of driving the primary of an inductive coupler with an alternating current being regulated at least in part according to a sensed voltage of a battery being charged via the secondary of the inductive coupler. The method includes the steps of driving the primary of an inductive coupler with an alternating current, receiving an alternating current in the secondary of the inductive coupler and producing a direct current, connecting the direct current to a battery of a portable device for charging the battery, producing an alternating current in the secondary of the inductive coupler responsive to the voltage level of the battery, receiving in the primary of the inductive coupler the alternating current from the secondary of the inductive coupler responsive to the voltage level of the battery, and regulating the alternating current in the primary side of the inductive coupler in response to the voltage level of the battery.

And further disclosed, according to an alternative preferred embodiment of the present invention, is a contactless charging system having a base unit, a portable unit, and a contactless coupler connected to the base unit and to the portable unit for transferring energy from the base unit to a load in the portable unit. The contactless coupler includes a first primary controller in the base unit and a first sensing device in the portable unit. The first sensing device is connected to the load in the portable unit for producing a feedback signal indicative of the energy in the load. The first primary controller regulates the energy transferred from the base unit to the load in response to the feedback signal. The contactless coupler is an inductive coupler. The system has a first communications sensing device electrically coupled to the inductive coupler for producing an information signal indicative of an operating parameter of the portable unit in the inductive coupler. A first communications controller is communicatively coupled to the inductive coupler for receiving the information signal and producing a control signal in the inductive device for controlling the operating parameter in the portable unit.

DESCRIPTION OF THE PREFERRED EMBODIMENTS

Figure 1:
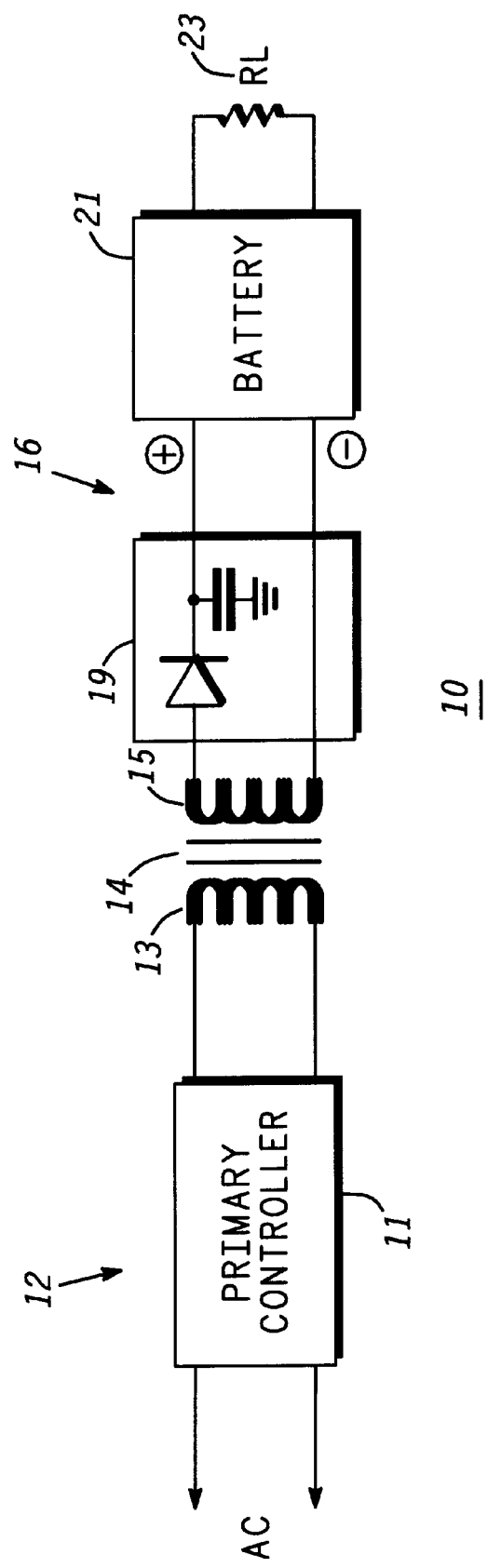
FIG. 1 shows a prior art inductively coupled battery charger without feed back to control the charging cycle.

The invention and the inventive principles are described with reference to the preferred embodiments shown in FIGS. 2 and 3. FIG. 1 shows a prior art system for comparison. As illustrated in FIG. 1, an inductively coupled charging system 10 has a primary side or base device 12 and a secondary side or portable device 16. A primary controller used as a primary charging device 11 as would be well known to one of ordinary skill in the art, is shown connected to the AC power source and to a primary coil 13. The primary coil 13 is shown inductively coupled to secondary coil 15 by field 14. The secondary coil 15 is coupled to battery 21 through a secondary charging device which is shown in this example as a rectifier circuit 19. The battery 21 in turn is connected to the load shown as RL 23. As would be well known to one of ordinary skill in the art, the energy coupled from the primary coil 13 is applied through the secondary coil 15 to charge the battery 21. However, no feed back is used in this prior art system, resulting in reduced charging efficiency and energy output of the battery.

Figure 2:
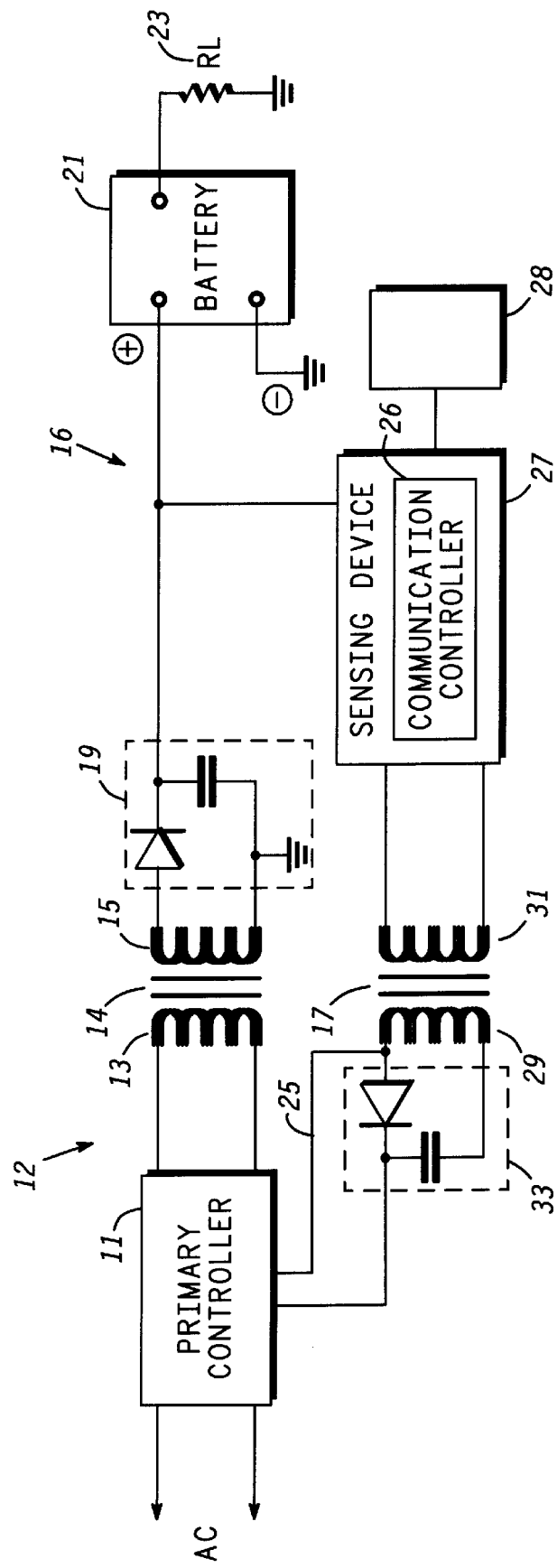
FIG. 2 shows an improved inductively coupled contactless battery charging system using inductively coupled feedback from the secondary to the primary side to provide control and regulation of the charging cycle and improve the charging efficiency.
Figure 3:
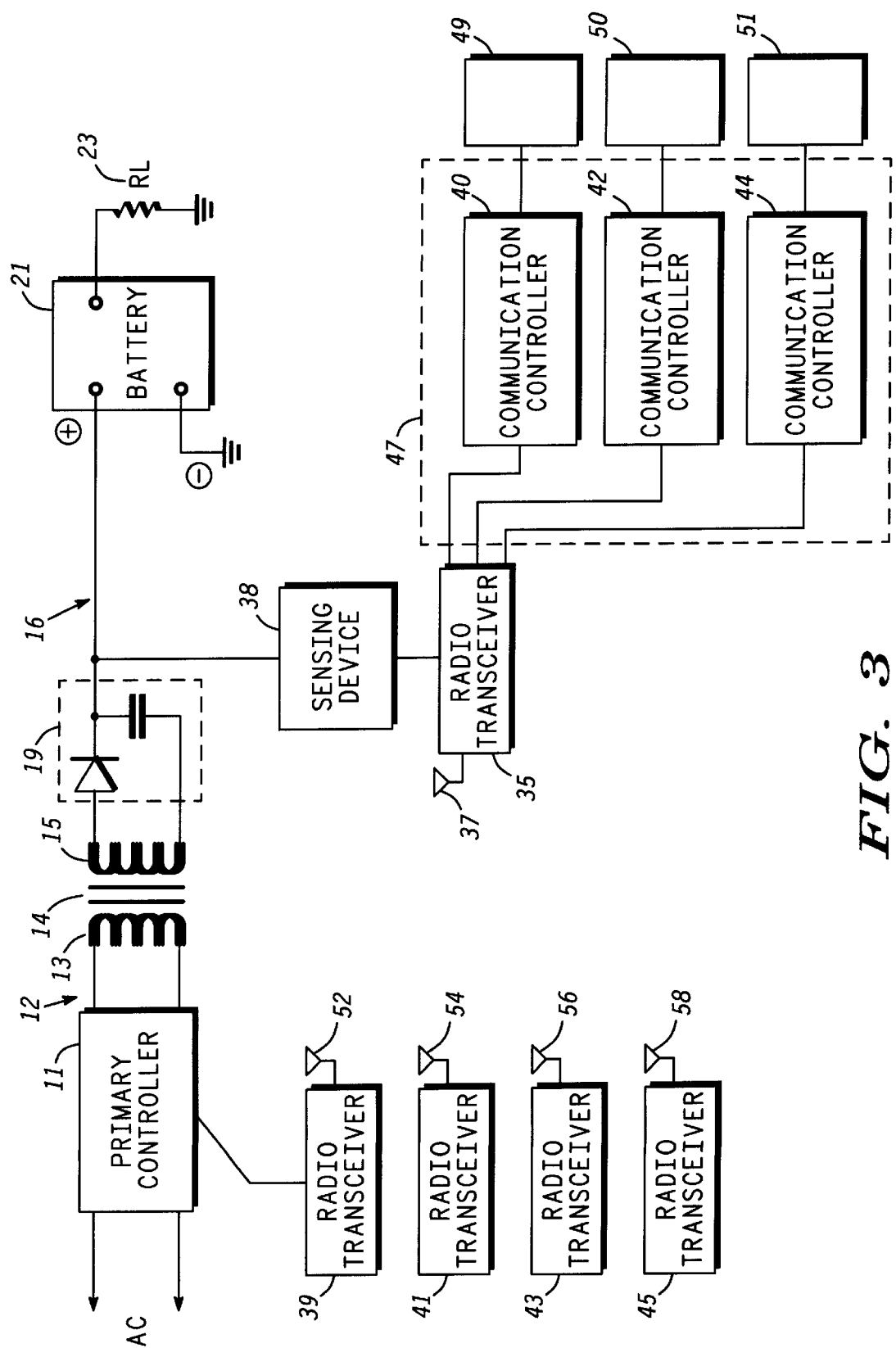
FIG. 3 shows the improved contactless battery charging system of FIG. 2, using an RF channel or loop to control and/or communicate with one or more devices.

The preferred embodiments illustrated in FIGS. 2 and 3 are used to show the invention and the inventive principles. In FIGS. 1, 2 and 3, the same numerals are used for the same or similar parts. As shown in FIG. 2, the output of the secondary charging device 19 is electrically coupled to the battery 21 for the preferred embodiment, which is used to provide power to load RL 23. As shown in FIG. 2, a sensing device 27 is electrically coupled to the secondary charging device 19 to receive a signal from the secondary charging device 19 indicative of the charging voltage. The sensing device 27 processes this indicating signal to produce a feed back signal for the primary controller device 11. The feedback control signal is transmitted from the secondary side or portable side 16 to the primary or base side 12 through inductively coupled coils 31 and 29, coupled by field 17. Note that in one preferred embodiment, the coils 31 and 29 may be inter-wound on the same core as the coils 15 and 13. This arrangement would help to reduce the size and cost of a contactless inductive coupling arrangement. However, the coils 31 and 29, in this example, can be wound on a separate core, or in another inductive coupling arrangement as may be obvious to one of ordinary skill in the art.

In an alternative embodiment, the inductive coupling arrangement comprising primary coil 13 and secondary coil 15 could be used to transmit the feedback signal from the secondary side 16 to the primary side 12. The coils 13 and 15, in this example, could be used to carry the charging energy signal from the primary coil 13 to the secondary coil 15 and a feedback signal from the secondary coil 15 to the primary coil 13.

An exemplary signal detection device 33 is shown in the primary side 12 connected to primary controller 11 and which provides a signal to the primary controller 11 indicative of the state of the charging process in the secondary 16. This signal is used by the primary controller 11 to regulate or control the voltage level of a charging signal being applied to the battery 21 as would be obvious, in view of the discussion above, to one of ordinary skill in the art. For example, to control the charging process and improve the charging efficiency, the controller 11 could adjust the voltage and/or cycling of an alternating current charging signal being applied to the primary coil 13 to adjust the energy being transferred to the battery 21.

In an alternative preferred embodiment of the present invention, the sensing device 27 comprises a communication control device 26 that, in this example, is electrically coupled to a device or component 28 in the secondary side 16 of the inductive coupling arrangement. The communication control device 26 preferably comprises a controller electrically coupled to a serial peripheral interface (SPI) or a serial communication interface (SCI) or a universal asynchronous receive and transmit device (UART), for communicating information according to known communication signaling protocols. The device or component 28, according to this example, may be a microphone or smart card or other communication component in the portable device. The communication control device 26 receives information signals from the device or component 28, that indicate, for example, operating parameters of the device or component 28.

In the alternative preferred embodiment, the communication control device 26 communicates information signals with the device or component 28. Information signals received from the device or component 28 indicate at least one operational parameter of the device or component 28.

Information signals transmitted to the device or component 28 can set a value for at least one operational parameter of the device or component 28. The sensing device 27, according to this preferred embodiment of the present invention, delivers information signals to the inductive coupling arrangement, such as via the coil 31 and coil 29, and thereby couple information signals from the device or component 28 in the secondary side 16 and deliver the information signals to the controller 11 in the primary side 12. Additionally, the controller 11 can deliver information signals to the inductive coupling arrangement, such as via coil 29 and coil 31 at an electrical signaling contact 25, and thereby inductively couple the information signals to the sensing device 27, and further thereby couple the information signals from the controller 11 in the primary side 12 and deliver the information signals to the device or component 28 in the secondary side 16. In this way, as an example of a preferred embodiment of the present invention, information signaling can be bi-directionally communicated between the controller 11 in the primary side 12 and the device or component 28 in the secondary side 16. The controller 11 monitors, for example, the received information signals to monitor the operating parameters of the device or component 28.

For example, the controller 11 may monitor the operating parameter of the device or component 28 comprising a smart card device in the portable device to verify whether a financial transaction was successfully initiated by the smart card device. As an alternative example, an operational status of the smart card device may be indicated in the information signal to the controller 11. The controller 11 in this way can track an operational state of the smart card device. Additionally, the controller 11 can transmit at least one information signal to the device or component 28 to set an operational parameter of the device or component 28. Preferably, the controller 11 controls and sets at least one operational parameter of the device or component 28 in response to monitoring at least one information signal received from the device or component 28 wherein the at least one information signal comprises a value associated with the at least one operational parameter of the device or component 28. For example, the configuration of operational parameters for a smart card device can be controlled and set by the controller 11 by communicating the information signals between the controller 11 and the device or component 28 comprising a smart card device. As will be appreciated by those of ordinary skill in the art, it is particularly valuable to be able to communicate information signals with a portable device contemporaneous with providing a charging energy to a power source, for example a battery 21, associated with the portable device.

As shown in FIG. 3, the principles of the invention may be applied to couple a feedback signal from a secondary side 16 to a primary side 12 across a contactless charging interface by utilizing a local RF link. Additionally, information signals can be communicated between the primary side 12 and the secondary side 16 by utilizing a local RF link. In this way, information signals, for example, associated with operating parameters of various secondary devices in the secondary side 16, may be communicated with a controller 11 in the primary side 12, such as for purposes of control and/or for communicating data signals.

Referring to FIG. 3, the secondary charging device 19 is electrically coupled to a sensing device 38 which provides to a radio transceiver 35 a feedback signal indicative of a charging parameter of the secondary charging device 19, such as indicative of a charging voltage, as described above. The radio transceiver 35 preferably comprises an encoder/decoder to encode a signal for radio transmission or to decode a signal received from the antenna 37. An RF encoded signal, in this example, is then broadcast transmitted through antenna 37 and received by antenna 52 and coupled to radio transceiver 39. The radio transceiver 39 preferably comprises and encoder/decoder to encode a signal for radio transmission or to decode a signal received from the antenna 52. After the radio transceiver 39 receives and decodes a received signal, the transceiver 39 electrically couples the decoded signal as a feedback signal to the primary controller 11.

The primary controller 11 then uses the feedback control signal, such as to regulate a parameter of the charging process, a charging signal voltage, and/or a cycling rate, and thereby improving the efficiency of the overall charging process and the energy transfer to the battery 21. In a similar manner, information or feedback signals for indicating the state of operating parameters of devices or components in the portable device, such as a microphone or smart card or other communication component in the portable device, may be encoded and transmitted as an RF encoded signal. As illustrated in FIG. 3, within communication control block 47 are shown three exemplary communication control devices, 40, 42 and 44, that are electrically coupled to the radio transceiver 35. Each of the communication control devices, 40, 42 and 44, for example, may comprise a controller electrically coupled to a serial peripheral interface (SPI) or a serial communication interface (SCI) or a universal asynchronous receive and transmit device (UART), for communicating information according to known communication signaling protocols. For example, such a signaling protocol for local area wireless communication may comprise an industry protocol specification generally referred to as Bluetooth.

Each of the communication control devices 40, 42, and 44, in this example, is electrically coupled to a device or component in the secondary side 16, shown as 49, 50 and 51. The respective device or component 49, 50 and 51, according to this example, may be a microphone or smart card or other communication component in the portable device. The communication control devices 40, 42, and 44, receive information signals from respective devices or components 49, 50 and 51, that indicate, for example, operating parameters of the respective devices or components 49, 50 and 51.

The communication control devices 40, 42, and 44, couple the respective received information signals to the radio transceiver 35 to broadcast transmit the information signals. In a preferred embodiment, the transmitted information signals are received by the antenna 52 of the radio transceiver 39 and coupled to the controller 11. The controller 11 monitors the information signals to monitor the operating parameters of the respective devices or components 49, 50 and 51. For example, the controller 11 may monitor the operating parameter of a smart card device in the portable device to verify whether a financial transaction was successfully initiated by the smart card device. As an alternative example, an operational status of the smart card device may be indicated in the information signal to the controller 11. The controller 11 in this way can track an operational state of the smart card device.

The controller 11, according to the preferred embodiment of the present invention, can couple an information signal to the radio transceiver 39 to broadcast transmit an information signal via the antenna 52. The radio transceiver 35 receives the transmitted information signal via the antenna 37. the radio transceiver 35 then couples the received information signal to at least one of the communication control devices 40, 42, and 44, that then couple the respective received information signal to the respective devices or components 49, 50 and 51. For example, the controller 11, in this communication arrangement, can transmit information to configure operational parameters for at least one of the devices or components 49, 50 and 51, in the portable device. The configuration process, preferably, can be in response to monitoring the operating parameters of the respective devices or components 49, 50 and 51, as has been discussed above. This provides additional benefit to a user of the portable device by allowing efficient charging of a battery 21 in the portable device and configuration of parameters of the portable device. Thereby, for example, a user of the portable device can "grab-and-go" remove a fully charged and configured portable device from a charging base unit. This is a significant advantage of the present invention that is not available in prior art charging systems.

In a preferred embodiment of the present invention, addressing information is coupled to the transmitted information signals to indicate a source and a destination for a transmission of information signals. Each radio transceiver, for example the radio transceiver 39 on the primary side 12 and the radio transceiver 35 on the secondary side 16, is associated with a unique address information to uniquely identify the particular radio transceiver in a wireless communication system. Additionally, each device coupled to the particular radio transceiver is also associated with a unique address information to uniquely identify the particular device. The unique address information is coupled to information signals being transmitted to uniquely identify the device that is the intended recipient of the information signals and the device that was the source of the information signals. Addressing schemes for wireless communication are generally well known. For example, the industry protocol specification generally referred to as Bluetooth provides guidance for uniquely addressing devices in a wireless communication system. Therefore, to associate each information signal with at least one device that it represents and to prevent interference between information signals produced by each of the various devices 38, 49, 50, and 51, and information signals delivered by each of the communication controllers 40, 42, and 44, and by information signals transmitted by each of the radio transceivers 35, 39, certain identification codes (such as addressing information) and frequency hopping techniques could be applied, as would be well known to those of ordinary skill in the art.

Additionally, other devices comprising radio transceivers 41, 43, and 45, with respective antennas 54, 56, and 58, could be located in the wireless communication system. These devices 41, 43, and 45, according to a preferred embodiment of the present invention, could also be capable of communication of information signals with the controller 11 and with the communication controllers 40, 42, and 44. Unique addressing information associated with information signals communicated with each device comprising a radio transceiver 41, 43, and 45, in accordance with the discussion above, facilitates identifying information signals associated with a source device and with a destination device in the communication system. In an exemplary embodiment of the present invention, the controller 11 may control a charging of the battery 21 of a portable device, and configure devices 49, 50, and 51, in the portable device, and additionally configure other related devices 41, 43, and 45. In this way, the user gains the additional benefit of quick configuration of all related devices and of charging of the battery 21. The convenience of an efficient battery charging process and quick configuration of all related devices provides a user with significant advantages over any prior art charging system.

Although specific embodiments of the invention have been disclosed, it will be understood by those having ordinary skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A contactless charging system comprising:
    an inductive coupler comprising a primary side and a secondary side for transferring charging energy from the primary side to the secondary side;
    a first controller electrically coupled to said primary side of said inductive coupler for controlling charging energy provided to said primary side of said inductive coupler;
    a wireless RF receiver electrically coupled to said first controller;
    a first secondary device electrically coupled to the secondary side of said inductive coupler to receive charging energy transferred from the primary side to the secondary side of said inductive coupler;
    a first sensing device coupled to said secondary side of said inductive coupler for producing a first signal indicative of the transferred charging energy received by said first secondary device;
    a wireless RF transmitter electrically coupled to said first sensing device for transferring a first information signal representative of said first signal from the secondary to the primary side of said inductive coupler, and wherein said first controller being responsive to said first information signal at the primary side for controlling charging energy transferred from the primary side to the secondary side;
    a second secondary device electrically coupled to the secondary side of said inductive coupler;
    a communication controller electrically coupled to said second secondary device;
    a wireless RF transmitter electrically coupled to said first controller for transmitting an RF signal including the third information signal for setting a value of at least one operating parameter of said secondary device; and
    a wireless RF receiver electrically coupled to said communication controller for receiving the RF signal and providing the third information signal to the first controller and for wirelessly transferring the third information signal to the second secondary device.

2. The contactless charging system of claim 1, wherein the secondary side of said inductive coupler, the first secondary device, the first sensing device, and the wireless RF transmitter, constitute an electrical circuit for a portable device.

3. The contactless charging system of claim 2, wherein the first secondary device comprises a rechargeable battery for the portable device.

4. The contactless charging system of claim 3, wherein the portable device comprises at least one of a two-way RF radio, a cellular phone, a paging device, and a wireless communicator.

5. The contactless charging system of claim 1,
    wherein the communication controller is electrically coupled to said wireless RF transmitter for transmitting a second information signal representative of at least one operating parameter of said second secondary device; and wherein the wireless RF receiver receives said second information signal and couples said second information signal to the first controller for monitoring at the first controller the at least one operating parameter of the second secondary device.

* * * * *